United States Patent [19]
Kato et al.

[11] Patent Number: 5,548,601
[45] Date of Patent: Aug. 20, 1996

[54] APPARATUS AND METHOD FOR DIAGNOSING FAILURES IN CONTROL SYSTEM

[75] Inventors: Shinji Kato, Tokyo; Chikashi Tagawa, Hiroshima-ken; Osamu Michihira, Hiroshima-ken; Akira Sone, Hiroshima-ken, all of Japan

[73] Assignees: Mazda Motor Corporation, Aki-gun; Naldec Corporation, Hiroshima-ken, both of Japan; a part interest

[21] Appl. No.: 160,126

[22] Filed: Dec. 2, 1993

[30] Foreign Application Priority Data

Dec. 2, 1992 [JP] Japan ................................ 4-323134

[51] Int. Cl.$^6$ ............................................. G06F 11/08
[52] U.S. Cl. ................................. 371/68.1; 371/36
[58] Field of Search ........................ 371/67.1, 68.3, 371/36, 9.1, 11.3, 16.3

[56] References Cited

U.S. PATENT DOCUMENTS 4,400,792  8/1983  Strelow .............................. 371/68.3
5,016,249  5/1991  Hurst et al. ........................ 371/68.3
5,136,704  8/1992  Danielsen et al. ................. 371/68.3
5,231,640  7/1993  Hanson et al. .................... 371/68.3
5,249,188  9/1993  McDonald ........................ 371/68.3
5,271,023  12/1993 Norman ............................ 371/68.3

FOREIGN PATENT DOCUMENTS 61-107436  5/1986  Japan .

OTHER PUBLICATIONS

*Microprocessors and Programmed Logic*, Second Edition by Kenneth L. Short ©1987 by Prentice–Hall Inc. pp. 73–77.

Primary Examiner—Vincent P. Canney
Attorney, Agent, or Firm—Keck, Mahin & Cate

[57] ABSTRACT

An apparatus for diagnosing failures in a plurality of control units is provided in a control system. The apparatus has a detection device provided outside of the control units for comparing output data representing processing results of the control units to detect disparity of the output data of the control units, and a device for determining that a failure has occurred in at least one of the control units when the detection device detects the disparity of the output data.

20 Claims, 6 Drawing Sheets

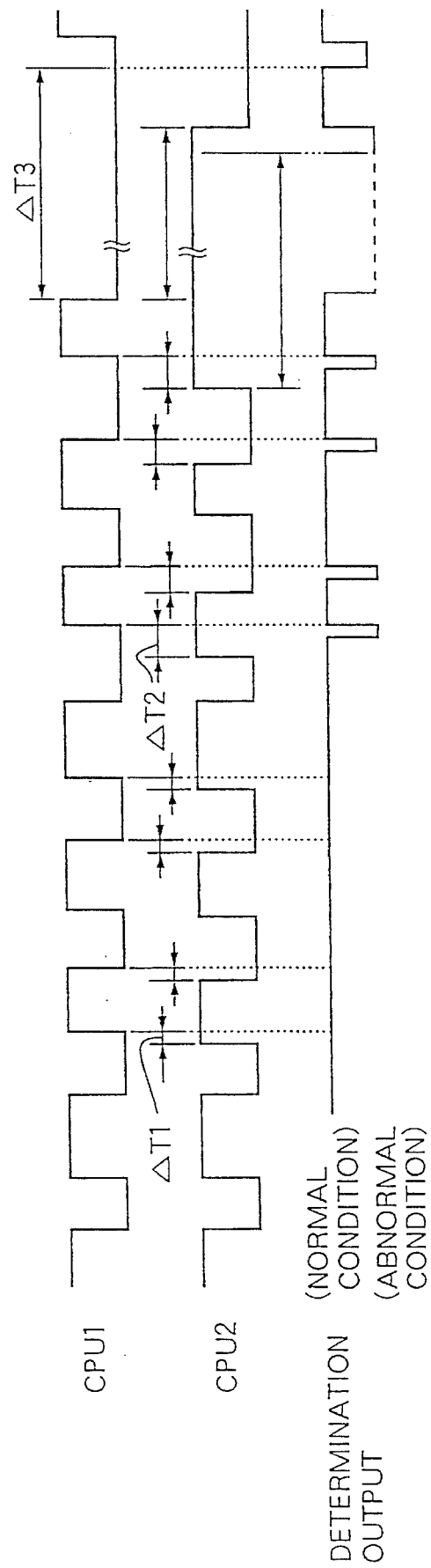

APPARATUS AND METHOD FOR DIAGNOSING FAILURES IN CONTROL SYSTEM

BACKGROUND OF THE INVENTION

1. Field of the Invention

The present invention relates to an apparatus and a method for diagnosing failures in a control system and in particular to an apparatus and method for diagnosing failures arising in a plurality of control units provided in the control system.

2. Description of Related Art

Conventional methods for diagnosing failures generated in a control system are disclosed in Japanese Laid-Open Patent publication No. 61-107,436 and the like. In conventional methods, the control system is provided with a self-diagnostic function. When the self-diagnostic function diagnoses a failure in the control system, the system stops processing an output so as to prevent the control system from erroneous operation owing to the failure.

There is known another conventional method for diagnosing failures in a control system in which failures are diagnosed during the operation of the control system. This conventional method employs a so-called watchdog which monitors a processing time and then diagnoses a failure when the processing time is outside a predetermined range. The watchdog is either an internal watchdog for monitoring the processing time with software or an external watchdog for monitoring the processing time with software and hardware.

A motor vehicle is provided with important control systems such as a four wheel steering control system (4WS) and an anti-skid braking control system (ABS). Each important control system is provided with a plurality of control units, each of which can carry out a control operation even if another control unit brakes down, so that good reliability can be maintained.

The above-mentioned watchdog method can be applied to a control system including a plurality of control units. Watchdogs are provided in the respective control units in the control system. The watchdogs monitor each other's processing times and then diagnose failures. However, according to the conventional methods, with such watchdog functions, failures in a control system can not be diagnosed when the following failures occur simultaneously:

a failure in which all of the control units break down owing to power supply fluctuation or presence of strong field noise;

a failure which can not be diagnosed by a watchdog, such as a failure which arises when a process with a failure which is to be detected is carried out in the watchdog timer; and a failure which can not be mutually monitored by the watchdogs, such as a failure that passes through the mutual monitoring program.

Although the above-mentioned failures occur very infrequently, such failures need to be monitored and diagnosed in a control system requiring high reliability.

Further, a watchdog can not diagnose a failure in the control system until the processing time, for example one cycle of the control operation, has passed, since the watchdog monitors the processing time in every control cycle of the control operation.

Since the above-mentioned conventional method using the watchdog only compares the values of timers, its applications are limited to specific fields.

SUMMARY OF THE INVENTION

It is therefore an object of the present invention to provide an apparatus and method for diagnosing failures in a control system which have not been possible to diagnose with the conventional watchdog.

It is another object of the present invention to provide an apparatus and method for diagnosing failures in a control system in a relatively short time.

It is still another object of the present invention to provide an apparatus and method for diagnosing failures which can be applied to failure diagnosis in various fields.

These and other objects are achieved according to one aspect of the present invention by providing an apparatus for diagnosing failures in a plurality of control units provided in a control system. The apparatus includes detection means provided outside of the control units for comparing output data representing the processing results of the control units to detect disparity of the output data of the control units, and means for determining that a failure has occurred in at least one of the control units when the detection means detects disparity of the output data.

In a preferred embodiment of the present invention, the output data are dummy outputs produced by the control units. The dummy outputs are different from control outputs used for an actual control operation and are not output outside of the control system.

According to one feature of the present invention, the detection means includes an exclusive OR circuit means.

These and other objects are achieved according to another aspect of the present invention by providing a method for diagnosing failures in a plurality of control units provided in a control system. The method comprises the steps of comparing output data representing the processing results of the control units to detect disparity of the output data of the control units, and determining that a failure has occurred in at least one of the control units when disparity of the output data has been detected.

The above and other objects and features of the present invention will be apparent from the following description made with reference to the accompanying drawings relating to preferred embodiments of the present invention.

BRIEF DESCRIPTION OF THE DRAWINGS

In the accompanying drawings:

FIG. 6 is a time chart showing one example for determining an abnormal condition according to the present invention.

DETAILED DESCRIPTION OF THE PREFERRED EMBODIMENTS

Preferred embodiments of the present invention will now be explained taking a representative application to an apparatus and method for diagnosing failures arising in a control system for motor vehicle anti-skid braking control and slip or traction control.

Figure 1:
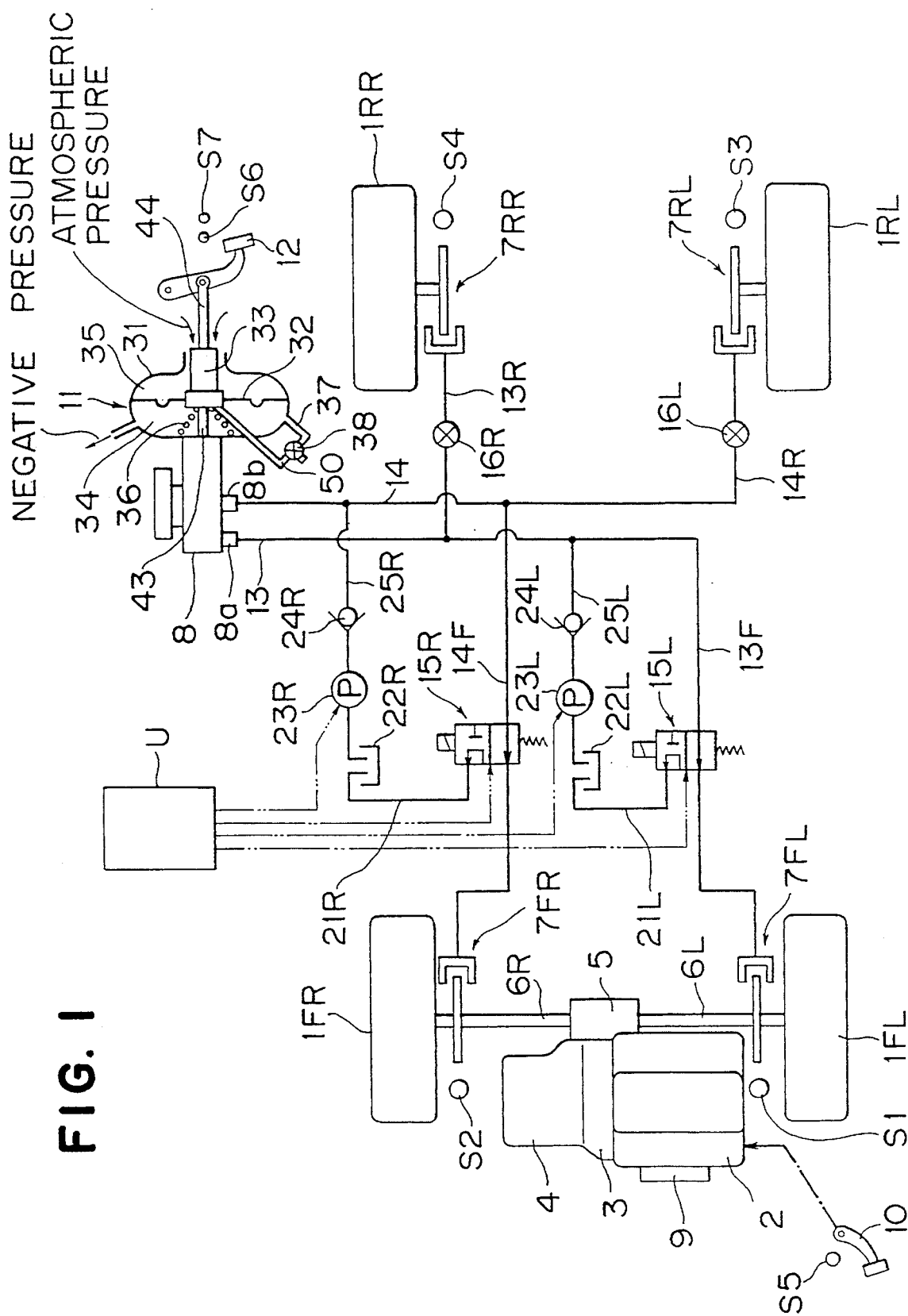
FIG. 1 is a schematic diagram of a brake hydraulic pressure circuit in a motor vehicle according to an embodiment of the present invention.

Referring to FIG. 1, a brake hydraulic pressure circuit in a motor vehicle will be first described.

The motor vehicle is provided with right and left front wheels 1FR, 1FL as driven wheels and right and left rear wheels 1RR, 1RL as non-driven wheels. The motor vehicle is installed with an engine 2 whose output torque is transmitted to a clutch 3, a transmission 4, a differential gear 5 and then transmitted to the right front wheel 1FR through a right drive shaft 6R and to the left front wheel 1FL through a left drive shaft 6L.

The wheels 1FR, 1FL, 1RR and 1RL are respectively provided with brakes 7FR, 7FL, 7RR and 7RL, which are disc-brakes utilizing hydraulic pressure. A master cylinder 8 serving as a source of the brake hydraulic pressure is of the tandem-type with two discharge ports 8a and 8b.

A brake line 13 connected with the discharge port 8a of the master cylinder 8 branches into branch lines 13F and 13R which are respectively connected to the left front brake 7FL and the right rear brake 7RR. Similarly, a brake line 14 connected to the discharge port 8b of the master cylinder 8 branches into branch lines 14F and 14R which are respectively connected to the right front brake 7FR and the left rear brake 7RL.

The branch lines 13F and 14F for the front wheels (the driven wheels) are provided with solenoid hydraulic pressure adjusting valves 15L and 15R, and the branch lines 13R and 14R for the rear wheels (the non-driven wheels) are provided with solenoid on-off valves 16R and 16L.

The hydraulic adjusting valves 15R and 15L work as switches for supplying the brake hydraulic pressure from the master cylinder 8 to the brakes 7FR and 7FL and to relieve the brake hydraulic pressure in the brakes 7FR and 7FL to reservoir tanks 22R and 22L through respective lines 21R and 21L. The switching operations of the hydraulic adjusting valves 15R and 15L are controlled by control signals received from control units in a control system designated as U in FIG. 1.

The brake fluid in the reservoir tank 21L is returned to the line 13 through a line 25L with a check valve 24L by a pump 23L, and similarly the brake fluid in the reservoir tank 22R is returned back to the line 14 through a line 25R with a check valve 24R by a pump 23R.

The operational force exerted on a brake pedal 12 by the driver is transmitted through a brake booster 11 to the master cylinder 8. The booster 11 may be a conventional vacuum-type booster, and is preferably a vacuum-type booster of the type described below which can boost the braking pressure even without the brake pedal being depressed by the driver.

Next, the vacuum-type booster 11 will be explained in detail. The booster 11 has a case 31 attached to the vehicle body and the master cylinder 8. The inner portion of the case 31 is divided into a first chamber 34 and a second chamber 35 by a diaphragm 32 and a valve body 33 connected to the diaphragm 32. The first chamber 34 is connected to an air intake passage (not shown) of the engine 2 so that negative pressure is constantly supplied to the first chamber 34. When the brake pedal 12 is not depressed by the driver, the second chamber 35 is connected through the first chamber 34, so that the booster 11 does not work.

On the other hand, when the brake pedal 12 is depressed by the driver, atmospheric pressure is introduced into the second chamber 35 and the diaphragm 32 is moved together with the valve body 33 in the forward direction so that the booster 11 boosts the braking force. The switching operation for introducing the atmospheric pressure and the negative pressure into the second chamber 35 is carried out by a valve provided in the valve body 33.

Figure 2:
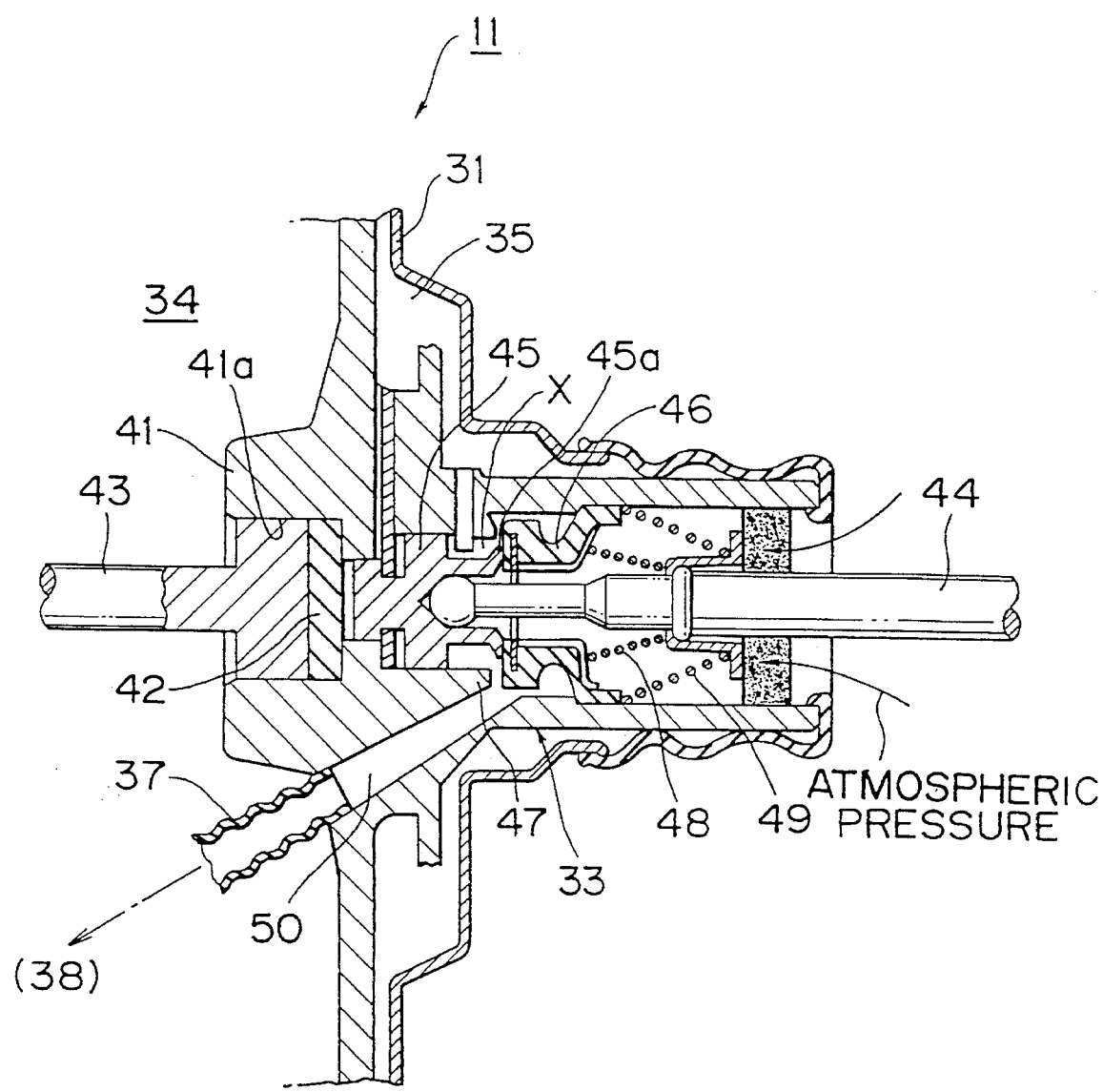
FIG. 2 is a sectional view showing a part of a brake booster in the motor vehicle shown in FIG. 1.

Referring to FIG. 2, the valve body 33 is provided with a power piston 41 attached to the diaphragm 32. The power piston 41 is provided with a recess portion 41a to which a reaction disc 42 and an end portion of an output shaft 43 are secured. The output shaft 43 is the input shaft of the master cylinder 8. One end of an input shaft 44 whose other end is connected to the brake pedal 12 is connected to a valve plunger 45 in the valve body 33. A vacuum valve 46 is provided behind the valve plunger 45.

The power piston 41 is provided with a pressure introducing conduit 50 which is constantly connected through space X provided around the valve plunger 45. The space X is constant communication with the second chamber 35. A valve seat 47 is provided in an opening end portion of the pressure introducing conduit 50. The vacuum valve 46 is operable to be seated on and separated from the valve seat 47. Similarly, the vacuum valve 46 is operable to be seated on and separated from a valve seat 45a provided on the rear end of the valve plunger 45.

Now suppose that negative pressure is introduced into the pressure introducing conduit 50 as illustrated in FIG. 2. When the brake pedal 12 is not depressed by the driver, the vacuum valve 46 is seated on the valve seat 45a but is separated from the valve seat 47, owing to the biasing force of springs 48 and 49. As a result, the negative pressure in the conduit 50 is introduced into the second chamber 35 through the space X so that the booster 11 does not boost the braking force.

On the other hand, when the brake pedal 12 is depressed by the driver, the input shaft 44 and the valve plunger 45 move forward (to the left side in FIG. 2). At this moment, the vacuum valve 46 seats on the valve seat 47 so that the vacuum introducing conduit 50 does not communicate with the space X. Thereafter the valve seat 45a is separated from the vacuum valve 46 so that atmospheric pressure is introduced into the second chamber 35 through the space X from the rear end of the valve body 33 as illustrated in FIGS. 1 and 2. As a result, the diaphragm 32 is deformed to move forward together with the valve body 33 so that the output shaft 43 moves forward to boost the braking force. The reaction force from the master cylinder 8 is transmitted to the brake pedal 12 through the reaction disc 42 and the valve plunger 45.

After the driver releases the brake pedal 12, a return spring 36 (see FIG. 1) forces the input shaft 44 back to the position shown in FIG. 2.

The structure of the booster 11 explained above is the same as that of a conventional booster. According to this embodiment of the present invention, there is preferably provided additionally, a conduit 37 having one end connected to the first chamber 34 and whose other end connected to the pressure introducing conduit 50. The conduit 37 is provided with a three-way solenoid valve 38 (see FIG. 1). When the three-way solenoid valve 38 is de-energized, the pressure introducing conduit 50 communicates with the first chamber 34. When the valve 38 is energized, the conduit 50 is communicated with atmospheric pressure so that atmospheric pressure is introduced from the conduit 50 into the second chamber 35 and through the space X even if the driver does not depress the brake pedal 12. As a result, the booster 11 can boost the braking force without depression of the brake pedal 12. This is employed when the brake control operation in the traction control is carried out.

Figure 3:
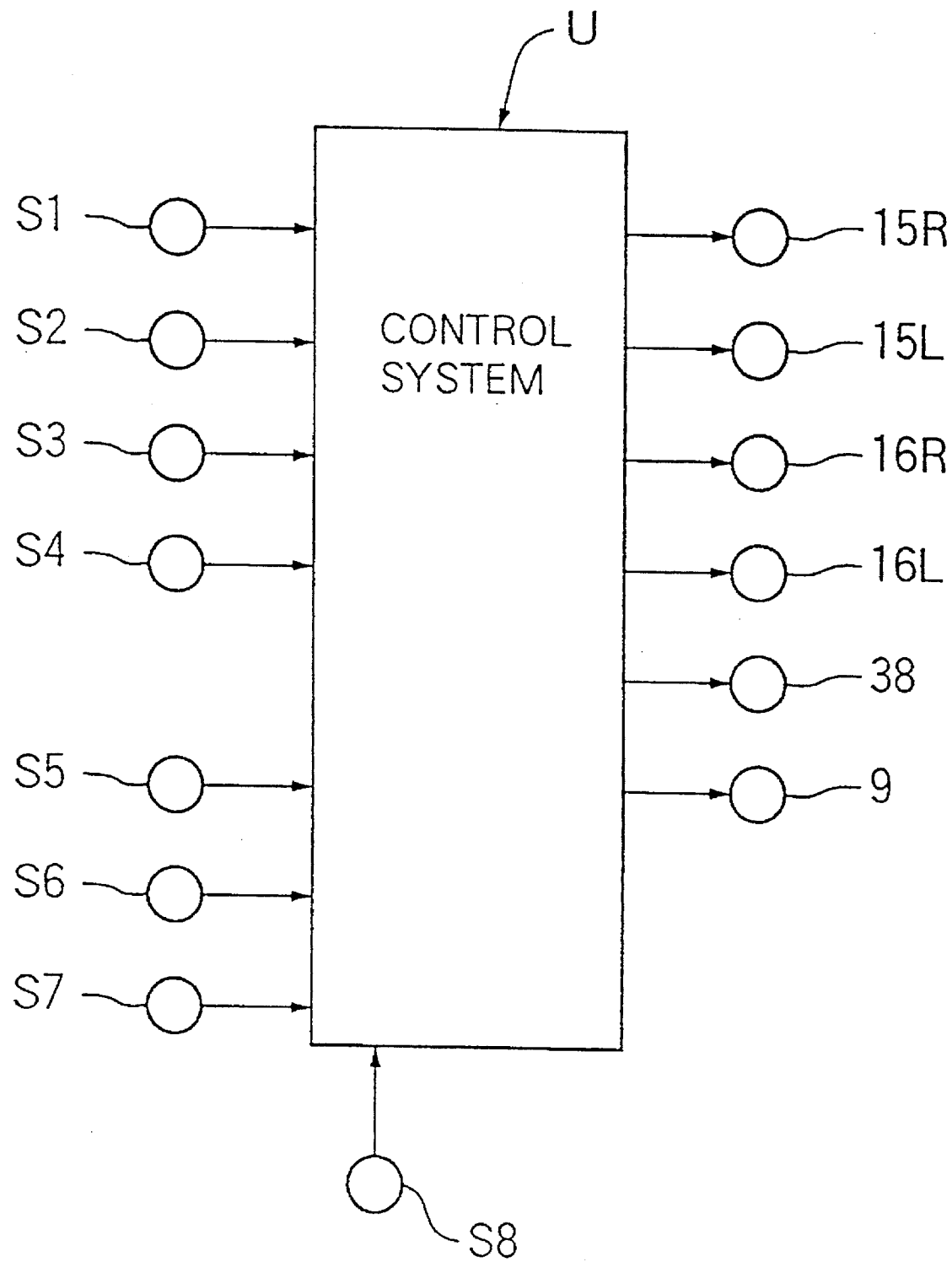
FIG. 3 is a view showing input signals and output signals in a control system in the motor vehicle shown in FIG. 1.

FIG. 3 shows the control system U, which includes two control units each having a microcomputer. Switches and sensors S1–S8 input their signals to the control units in the control system U. Sensors S1–S4 detect the respective wheel speeds of the wheels 1FR,1FL, 1RR and 1RL. Switch S5 is an accelerator switch which is turned ON when an accelerator pedal 10 is fully released by the driver. Switches S6 and S7 are activated when the brake pedal 12 is depressed by the driver. One of the switches S6 and S7 is of normal-open type and other is of normal-closed type. Sensor S8 detects the engine speed. The control units in the control system U output various signals to the valves 15R, 15L, 16R and 16L and to a torque adjusting means 9 for adjusting the torque generated by the engine 2. Namely, the engine torque is controlled by a throttle valve operation or by a combined operation of fuel cut-off at the respective cylinders and adjustment of the fuel injection timing.

Figure 4:
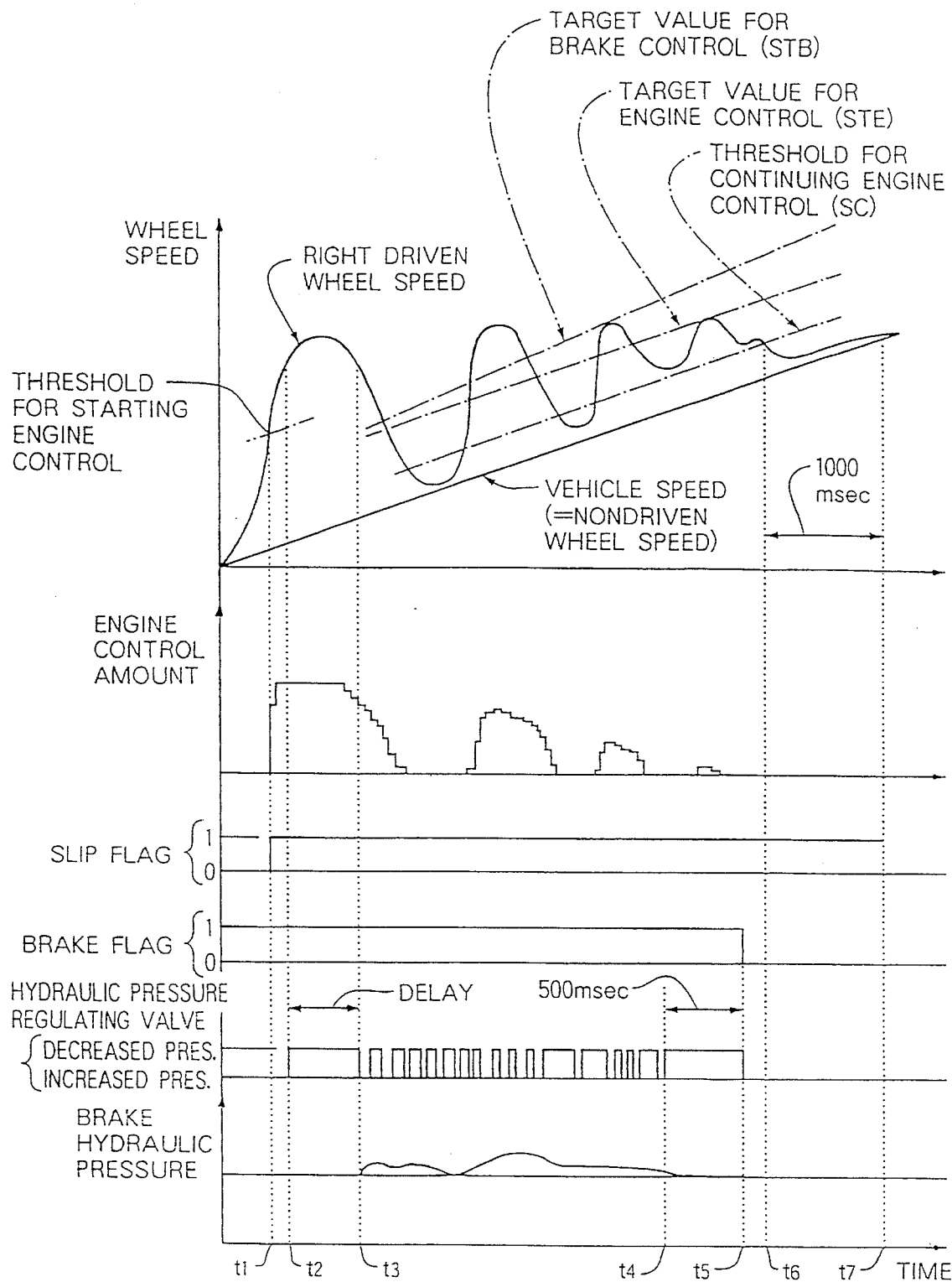
FIG. 4 is a time chart showing one example of slip control which carries out an engine control operation and a brake control operation in the motor vehicle in FIG. 1.

Next, slip or traction control will be described with reference to FIG. 4. FIG. 4 illustrates an example in which large slip has arisen at the driven right wheel 1FR.

The engine control operation in slip control will be described first. The engine control operation is started at time t1 when either one or the other of actual slip values of the right and left front wheels 1FR land 1FL (the driven wheels) becomes greater than a predetermined threshold for starting engine control. In the engine control, feedback control is carried out by the torque adjusting means 9 so as to reduce the slip value of the wheel to less than a target value for engine control (STE) (the first target value). A threshold for continuing engine control (SC) set to be smaller than the first target value STE. The engine control operation is stopped, when the accelerator pedal 10 is fully released or when the actual slip of the wheel continues to be less than the threshold SC for longer than a predetermined time period, namely the time period between t6 and t7 in FIG. 4.

Next, brake control operation in the slip control will be described. The brake control operation is started when the following four conditions are satisfied:

1. the engine control operation has been carried out;
2. the difference in the slip values between the right front wheel 1FR and the left front wheel 1FL has become greater than a predetermined value (t2 in FIG. 4);
3. vehicle speed VS is less than a predetermined first vehicle speed V1; and
4. a predetermined delay time described below has passed.

The brake control operation is prohibited from starting when either one of the switches S6 and S7 detects that the driver has depressed the brake pedal 12.

Before the brake control operation is started, the three-way solenoid valve 38 is energized at the same time as the engine control operation is started, and the pressure adjusting valves 15R and 15L are operated to be at relief positions and the on-off valves 16R and 16L are operated to be at off positions (closed positions). As a result, the booster 11 is ready for boosting the braking force. Thereafter, the brake control operation is started when the negative acceleration of the actual slip value reaches a predetermined value at t3 in FIG. 4. The time period between the time t2 and the time t3 is the predetermined delay time.

The brake control operation, in which the pressure adjusting valves 15R and 15L are operated by feed-back control and duty control, is carried out independently for the right and left front wheels 1FL and 1FL so as to reduce the slip values to less than a target value for brake control (STB) (the second target value) which is greater than the first target value STE.

The brake control operation is stopped when any one of the following conditions is satisfied:

1. the engine control operation has been stopped;
2. the vehicle speed has become greater than a predetermined second vehicle speed V2 which is greater than the first vehicle speed V1;
3. pressure of both adjusting valves 15R and 15L has been decreased and the described pressure condition has continued for a predetermined time period such as 500 msec shown as the time period between t4 and t5 in FIG. 4;
4. the brake pressures in both the brakes 7FR and 7FL has become zero; or
5. either of the switches S6 and S7 detects that the driver has depressed the brake pedal 12.

As long as the engine control operation is in progress when the brake control operation is stopped, the three-way switching valve 38 is energized, the pressure adjusting valves 15R and 15L are operated to be at the relief positions and the on-off valves 16R and 16L are operated to be at the off position. These conditions are the same as the wait condition for the brake control operation before the brake control operation is started as described above.

Thereafter, when the engine control operation is stopped or when the driver depresses the brake pedal 12, the three-way switching valve 38 is de-energized.

In the embodiment of the present invention described above, the pressure adjusting valves 15R and 15L for adjusting the brake pressures in the driven wheels 1FR and 1FL are controlled by control signals received from the control units in the control system U. The control system U includes two control units which diagnose failures by mutual watching so that one of the control units can carry out the slip control operation even when the other control unit has broken down.

Next, a description is provided of how failures arising in the two control units of the control system are diagnosed.

Figure 5:
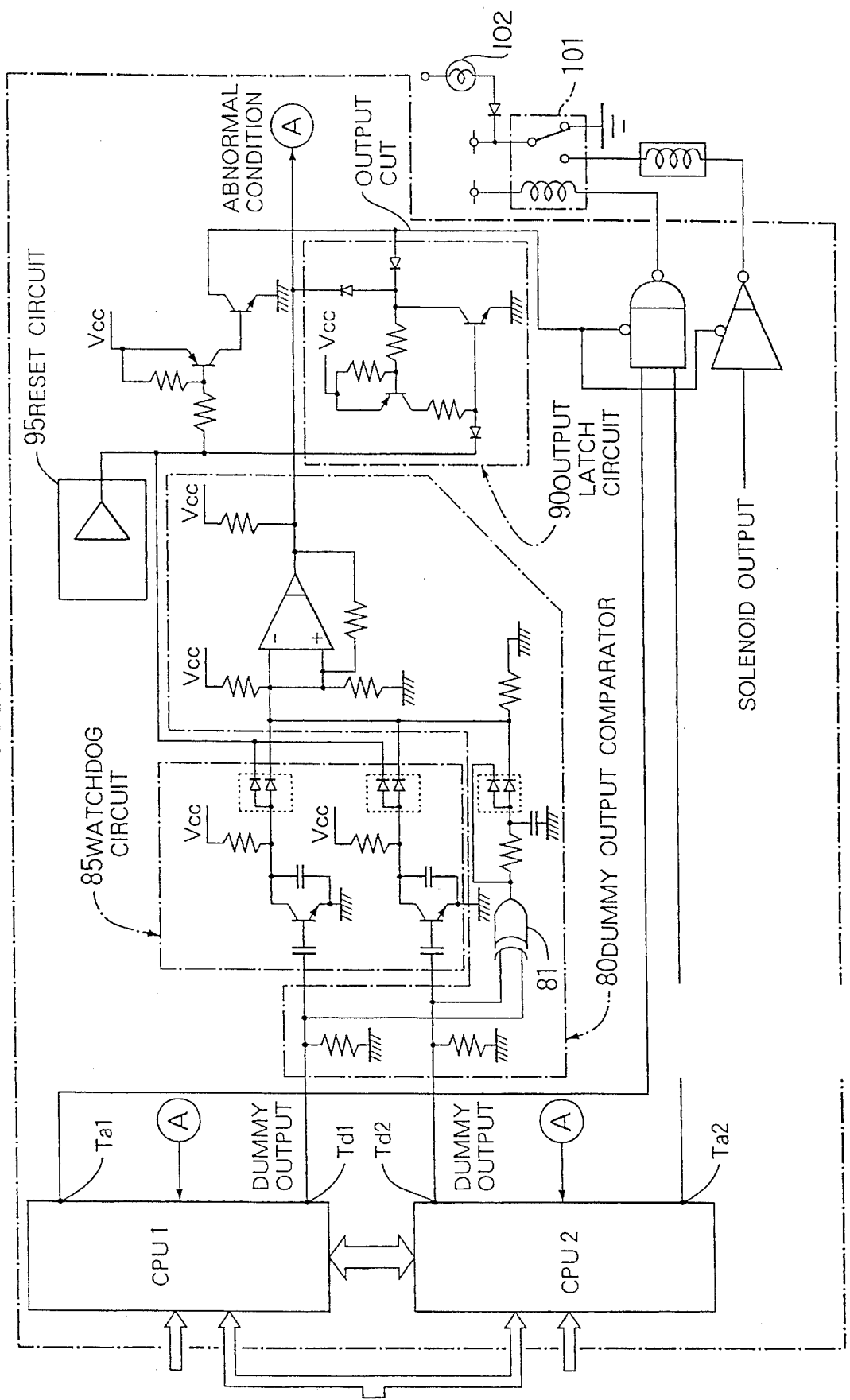
FIG. 5 is a control circuit including a plurality of control units acceding to an embodiment of the present invention.

Referring to FIG. 5, the control system includes two control units CPU1 and CPU2 which can exchange data with each other. The control units CPU1 and CPU2 have control output terminals Ta1 and Ta2 on which control signals for the slip control operation are output, and further have dummy output terminals Td1 and Td2 on which dummy signals for diagnosing failures are output. The dummy signals output by the two control units CPU1 and CPU2 are respectively input to a watchdog circuit 85 and to a dummy output comparator 80. An output latch circuit 90 is provided on the output side of the watchdog circuit 85 and the dummy output comparator 80. The output latch circuit 90 is provided with a reset circuit 95.

In this embodiment of the present invention, the pressure adjusting valves 15 (15R, 15L) include solenoid valves (see FIG. 1). These solenoid valves are operated by output signals (solenoid outputs) from the control unit CPU2 for example. The control system is provided with a solenoid valve drive circuit having a fail-safe relay 101 and a warning lamp 102.

The above-mentioned dummy signals or dummy outputs are created in order to diagnose failures and are not output outside of the control system. The dummy signals can be created by the following methods:

1. data of the dummy outputs are changed in cycles based on a predetermined rule which has no connection with the actual control operation;
2. the actual control signals are employed as the dummy output, without processing or as processed based on necessary conditions;
3. results obtained by operating all hardware in the CPU are employed as the dummy outputs; or
4. since it is difficult to detect a failure arising when the data of the dummy outputs have been constant, data which are changed by being processed based on specific conditions are employed as the dummy outputs.

The above-mentioned data of the dummy outputs may be output by the following methods:

1. the data of the dummy outputs are output by pulse width (duration) modulation (PWM) in which the pulse width may be scaled up or down;
2. the data of the dummy outputs are output by pulse frequency modulation (FM);
3. the data of the dummy outputs are converted from digital to analog and the converted analog data are output; or
4. the data of the dummy outputs are output in parallel.

The dummy output comparator 80 includes an exclusive OR circuit 81 for detecting disparity between the two dummy outputs from the CPU1 and the CPU2. The dummy output comparator 80 detects a failure in the CPU1 and/or CPU2 when the exclusive OR circuit detects the disparity between the two dummy outputs from the CPU1 and the CPU2. As a result, since the processed results are determined to be disparate even if the difference between the processed results of the CPU1 and the CPU2 is slight, failures of the CPU1 and the CPU2 can be detected with high certainty. In contrast, since the conventional apparatus employs an AND circuit, failures arising in the control units are detected with low certainty.

The watchdog circuit 85 monitors processing times of the CPU1 and the CPU2, and determines that the condition of the CPU1 and/or the CPU2 is abnormal when the processing times of the CPU1 and/or the CPU2 is outside a predetermined range. According to this embodiment of the present invention, when no level variation occurs in the control outputs of the control units for more than a predetermined time period, the watchdog circuit 85 determines that the condition is abnormal.

On the other hand, when the dummy output comparator 80 detects an abnormal condition of the CPU1 and/or the CPU2, the output latch circuit 90 latches the control outputs by producing an output cutting signal for cutting off the solenoid valve drive circuit from the time that power is turned OFF and to the time the power is turned ON again.

The reset circuit 95 is provided for checking the operation of the output latch circuit 90 when the output latch circuit 90 has latched the output determined to be abnormal. Since the reset circuit 95 is provided, the operation of the output latch circuit 90 can be checked without the control system being fully OFF, for example without the engine being stopped. According to this embodiment, the output latch circuit 90 can preferably be reset only once.

In operation, after the control system has been started, data are exchanged both ways between the control units CPU1 and CPU2. Namely, the input data and the dummy output modes which are changed in every control cycle are exchanged between the CPU1 and the CPU2. The control units CPU1 and CPU2 then carry out the same processing or operations based on a predetermined rule.

Thereafter, the results of processing or operations in the control units are synchronously output as dummy outputs to the dummy output comparator 80 and, thereafter the exclusive OR circuit 81 determines parity/disparity therebetween. Finally, when the disparity is determined, the dummy output comparator 80 determines that the condition is abnormal.

When parity or substantive parity is determined, one of the control units, for example the CPU2, is thereafter employed for conducting the actual slip control.

The dummy output comparator 80 can determine an abnormal condition by any of the following methods:

1. the circuit 80 is provided with a timer defining the maximum permissible value of the difference (clock difference or synchronism difference) between the dummy outputs of the two control units in a normal condition g, and the circuit 80 determines that the condition is abnormal when the magnitude of the disparity becomes greater than the above-mentioned maximum permissible value;
2. an abnormal condition is determined when the value, obtained by summing the time period disparities other than those of the dummy outputs in the normal condition over a predetermined time or up to the time of a reset operation, is greater than a predetermined value; or
3. an abnormal condition is determined when the number of disparities in which the difference in the dummy outputs is greater than that in the normal condition becomes greater than a predetermined number within a predetermined time period or up to the time of a reset.

FIG. 6 is a time chart showing one example of abnormal condition determination based on the above-mentioned methods. A normal condition is determined when the difference (delta T1) between the dummy outputs of the control units CPU1 and CPU2 is less than the maximum permissible difference in the dummy outputs in the normal condition. On the contrary, an abnormal condition is determined when the difference (delta T2) between the dummy outputs of the control units CPU1 and CPU2 is greater than the maximum permissible difference in the dummy outputs in the normal condition. Further, the watchdog circuit 85 determines an abnormal condition to be present when the levels of the dummy outputs of the control units CPU1 and CPU2 remain at constant values (delta T3) for more than a predetermined time period.

When the input data to the control units are obtained by sampling the signals from the wheel speed senors, the likelihood of a difference arising between the control units becomes high. Since this difference is unavoidable, it may become very difficult to determine an abnormal condition. In order to avoid this problem, this embodiment of the present invention uses the following methods for ensuring that the results of the operations by the two control units agree during normal condition by exchanging input data with each other:

1. the same input data are input to the two control units and the two control units employ the same processing operations for parity between the results of the operations by the two control units;
2. where the input data input to the two control units are different, substantially the same results of the operation are provided when the input data are substantially the same; or
3. where the input data input to the control units are different, substantially the same results of the operation are provided by employing a predetermined group of input data which may be divided by switching inputs.

According to this embodiment of the present invention, since the dummy output comparator 80 for detecting failure of the control units CPU1 and CPU2 is provided outside of the control units, it can compare the final results of the various control units. As a result, failures arising under conditions can be detected. Further, the time required for detecting failures can be greatly shortened. This is because the time period used for detecting failures in this embodiment is a clock time difference or a time difference between the output cycles of the control units CPU1 and CPU2, while in the conventional watchdog it is at least one cycle of the control operation.

Further, according to this embodiment of the present invention, the dummy output comparator 80 detects failures by detecting the disparity between the operation results of the control units. Since the dummy output comparator 80 can detect a very slight disparity between the two control units, failures in the control units can be detected with higher certainty than is possible by the conventional method employing an AND circuit for detecting failures.

Therefore, according to this embodiment of the present invention, simultaneous failures in the control units and failures which cannot be detected by the conventional watchdog can be detected.

Further, according to this embodiment of the present invention, since the results of the operations of the control units are compared with each other, the embodiment can be applied to failure diagnosis in a broad range of fields. Since conventional watchdog employs a simple timer, its application is limited to specific fields.

Still further, according to the embodiment of the present invention, the control units CPU1 and CPU2 send the dummy outputs to the dummy output comparator 80, in addition to sending outputs for actual control, e.g. a traction control. As a result, the present invention can be applied to an apparatus and method which diagnose failures arising in various types of processing with operation results which are not output to the outside of the control system.

While the above-mentioned embodiment of the present invention is provided with the two control units CPU1 and CPU2 both of which have the same functions, according to the present invention, one control unit, for example the unit CPU1, may be replaced with a diagnosis unit, which functions exclusively for diagnosing failures and does not have a control function outside of the control system. This enables cost to be reduced while maintaining high reliability. In this case, the operating time can be reduced by employing the following methods:

1. the diagnosis unit determines the control modes of the control unit based on input conditions from the control unit and outputs dummy outputs; or 2. data representing the processing times of the respective processing patterns are stored beforehand in a diagnosis unit, and the diagnosis unit determines the processing time of the control unit from the stored data based on input conditions and compares it with an actual processing time.

While the present invention has been illustrated by means of several preferred embodiments, one of ordinary skill in the art will recognize that modifications and improvements can be made while remaining within the spirit and scope of the invention. The scope of the invention is determined solely by the appended claims.

What is claimed is:

1. An apparatus for diagnosing failures in a plurality of control units provided in a control system comprising:

detection means, provided outside of the control units, for comparing dummy outputs output by the control units, representing processing results of the control units, to detect disparity of the dummy outputs, said dummy outputs being different from control outputs used for an actual control operation, being obtained as the control units carry out identical predetermined processes and not being output outside of the control system; and determining means for determining that a failure has occurred in at least one of the control units when the detection means detects the disparity of the dummy outputs.

2. An apparatus according to claim 1, wherein said detection includes an exclusive OR circuit means.

3. An apparatus according to claim 1, wherein said dummy outputs are changed in cycles having no connection with the actual control operation.

4. An apparatus according to claim 1, wherein said detection means detects the disparity by comparing a difference between respective dummy outputs with a difference from between the respective dummy outputs during a normal condition of the control units.

5. An apparatus according to claim 1, wherein each of said dummy output is outputs by pulse width modulation.

6. An apparatus according to claim 1, wherein said apparatus further comprises watchdog means for monitoring processing times of the control units and determining that the control units are operating abnormally when at least one of the processing times is outside of a predetermined range.

7. An apparatus according to claim 1, wherein said apparatus further comprises output latch means for latching the control outputs used for the actual control operation when said determining means has determined that said failure has occured.

8. An apparatus according to claim 7, and further comprising reset means for checking an operation of the output latch means when the output latch means latches the control outputs used for the actual control operation.

9. An apparatus according to claim 1, wherein dummy outputs output by at least one of said control units are exclusively used by said detection means and said determining means.

10. A method for diagnosing failures in a plurality of control units provided in a control system comprising the steps of:

obtaining dummy outputs output by the control units, representing processing results of the control units, as the control units carry out identical predetermined processes, said dummy outputs being different from control outputs used for an actual control operation;

comparing the dummy outputs to detect disparity of the dummy outputs, said dummy outputs not being output outside of the control system; and determining that a failure has occurred in at least one of the control units when the disparity of the dummy outputs is detected.

11. An apparatus according to claim 1, wherein said control units include output portions for outputting the control outputs used for the actual control operation and dummy output portions for outputting the dummy outputs, said dummy output portions being connected to the detection means.

12. An apparatus according to claim 11, and further comprising watchdog means, connected to said dummy output portions, for monitoring processing times of the control units and determining the control units to be operating abnormally when at least one of the processing times is outside of a predetermined range.

13. An apparatus according to claim 7, wherein said apparatus further comprises watchdog means for monitoring processing times of the control units and determining that the control units are operating abnormally when at least one of the processing times is outside of a predetermined range.

14. An apparatus according to claim 8, wherein said apparatus further comprises watchdog means for monitoring processing times of the control units and determining that the control units are operating abnormally when at least one of the processing times is outside of a predetermined range.

15. An apparatus according to claim 13, wherein said detection means includes an exclusive OR circuit.

16. An apparatus according to claim 14, wherein said detection means includes an exclusive OR circuit.

17. An apparatus according to claim 13, wherein said detection means detects the disparity by comparing a difference between respective dummy outputs with a difference from between the respective dummy outputs during a normal condition of the control units.

18. An apparatus according to claim 14, wherein said detection means detects the disparity by comparing a difference between respective dummy outputs with a difference from between the respective dummy outputs during a normal condition of the control units.

19. An apparatus according to claim 7, wherein said dummy outputs are changed in cycles having no connection with the actual control operation.

20. An apparatus according to claim 8, wherein said dummy outputs are changed in cycles having no connection with the actual control operation.

\* \* \* \* \*